W. V. JOHNSON & F. H. GIBBS.
MINE CAR ASSEMBLY.
APPLICATION FILED AUG. 6, 1917.
1,244,740.
Patented Oct. 30, 1917.
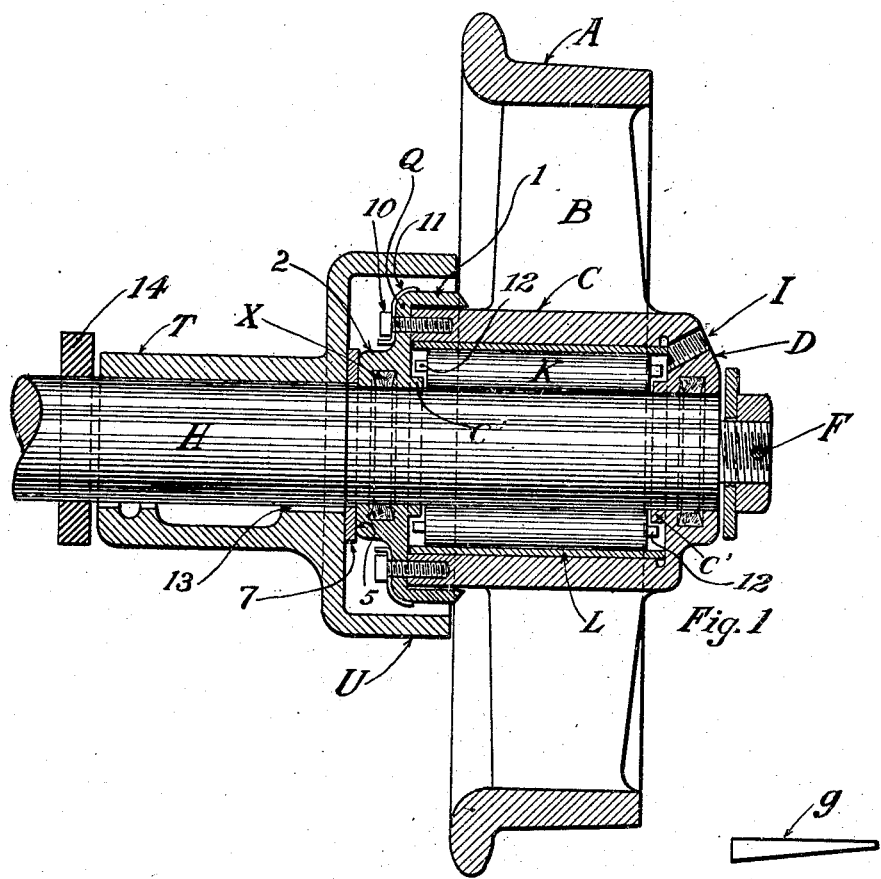
Fig. 1
Fig. 3
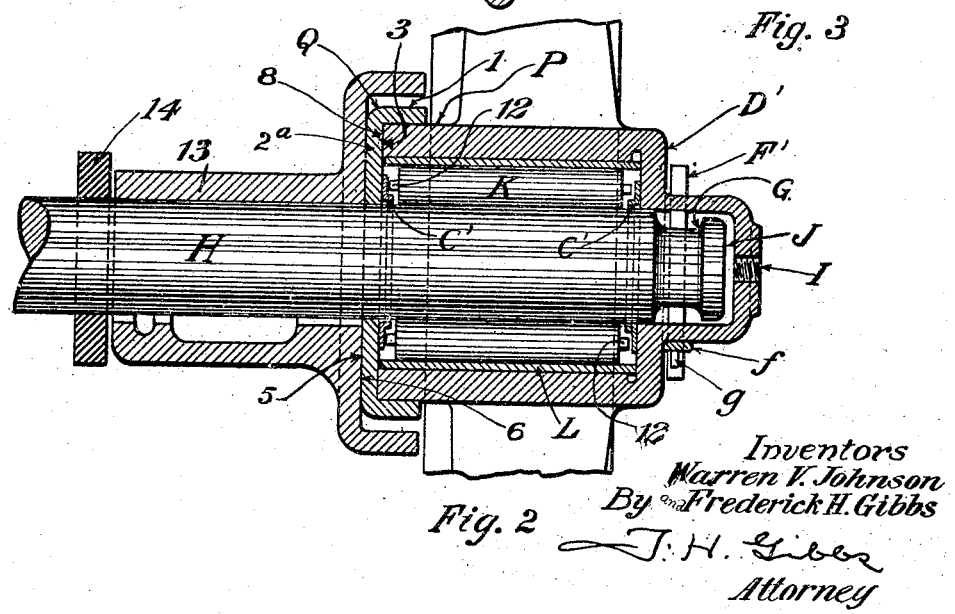
Fig. 2
Inventors
Warren V. Johnson
By and Frederick H. Gibbs
J. H. Gibbs
Attorney

UNITED STATES PATENT OFFICE.

WARREN V. JOHNSON, OF BLOOMSBURG, PENNSYLVANIA, AND FREDERICK H. GIBBS, OF BROOKLYN, NEW YORK, ASSIGNORS TO AMERICAN CAR AND FOUNDRY COMPANY, OF ST. LOUIS, MISSOURI, A CORPORATION OF NEW JERSEY.

MINE-CAR ASSEMBLY.

1,244,740.

Specification of Letters Patent.

Patented Oct. 30, 1917.

Application filed August 6, 1917. Serial No. 184,660.

*To all whom it may concern:*

Be it known that we, WARREN V. JOHNSON and FREDERICK H. GIBBS, residing at Bloomsburg, Columbia county, Pennsylvania, and borough of Brooklyn, county of Kings, city and State of New York, respectively, and being citizens of the United States, have invented certain new and useful Improvements in Mine-Car Assemblies, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a central longitudinal sectional view of a novel mine car wheel;

Fig. 2 is a similar view of a modification thereof; and

Fig. 3 illustrates a wedge-shaped locking pin employed as hereinafter described.

The invention comprises features of novelty in details of construction and coöperation of parts intended for use in mine cars in which car framing parts (not shown but well known) are mounted upon the journal boxes and supported by wheels and axles of the type illustrated.

An object of the invention is to provide a running gear assembly comprising a simple, economical and durable wheel consisting of a minimum number of parts which may be readily secured in position upon an axle, retain a roller bearing in position within a roller bearing chamber of the wheel, provide means for locking the roller bearing assembly in position within the wheel hub, and to provide a suitable mass of metal next the journal box to resist wear due to friction and to present a smooth vertical bearing face of some suitable area at the rear side of the wheel hub to coöperate with a journal box secured to the car and preferably adapted to coöperate with friction-reducing means and lubricant-retaining means properly conjoined with the wheel, as hereinafter more particularly described.

Referring particularly to the parts, A is the tread, B the spokes and C the hub of a mine car wheel which is provided with a more or less closed outer end wall D forming an extension of the hub, though cast integral therewith and the axle H being perforated to permit the insertion and removal of a cotter pin, as F, though it is evident that other means of securing the wheel in position may be substituted for the cotter pin, as for example the bolt F' which coöperates with an annular groove G cut in the outer end of the axle H, as shown in Fig. 2, instead of passing through a perforation in such axle, as shown in Fig. 1. In either case, however, it is preferred that the outer wall of the hub be provided with a screw-threaded orifice I, which may be utilized for temporary connection therewith of a grease gun or lubricant supplying tool from which lubricant may be injected into the lubricant chamber J or the roller bearing chamber when desired, and as a proper lubrication of mine car wheels is a very material factor, contributing to the life of such wheels in service, it is advisable that, regardless of whether the cotter pin F or bolt F' is employed to lock the wheel in position on the axle, it will be convenient at all times to replenish the supply of lubricant within the wheel, and preferably in the reservoir J, without removing the wheel from the axle. It is also advisable to form the outer end of the hub of the wheel either partly or wholly closed. It is preferred that the outer end of the hub be formed of a single wall cast integral with the major portion of the hub, as shown for example in Patent No. 321,590 of July 7, 1885, or as modified in Fig. 2.

In the type of wheel shown in the drawing, in which independent loose rollers are illustrated, it is advisable to provide a surface to serve as an abutment for the outer end of the rollers and a roller-retaining flange at each end of the rollers, as C', to prevent loss of such rollers when the wheel is removed from the axle.

To provide a suitable wearing face for the rollers K, a high-carbon steel sleeve L is inserted within the wheel hub, which sleeve extends preferably into contact with the rear face of the wall D forming the end wall of the hub or the wall D' formed intermediate the ends of the hub. This wall may be formed as shown in Fig. 1, or the wall may consist of the face D' of Fig. 2, as may be desired, but in either instance the sleeve is positioned preferably so as to rest in approximate contact with the rear face of such wall. The axle H may be formed from any suitable material, but it is preferred to use a heat-treated axle where hardened steel rollers K are employed, though we do not wish to be limited in this respect, as it is obvious that a cold-rolled steel axle may be used, if desired, and might be employed where cold-rolled steel rollers are substituted for the high-carbon steel rollers K, referred to.

Various means have been provided at the inner end of the wheel hub for retaining roller bearings in position, such as flanged collars secured within the roller bearing chamber of the hub and locked in position by means of rivets, or other fastening means, projected through such flanged collars and the metal of the inner hub extension P, but these are objectionable because, first, of the multiplicity of parts and, second, the holes formed through the metal of the hub weaken the hub and there is always the possibility of cracking the hub while heading the rivets thus employed. To overcome these objections and to strengthen the hub rather than to weaken it, the cap Q is employed which cap comprises a cup-shaped member including the flange 1 extending longitudinally of the wheel hub and parallel with the axle and the web 2 which extends inwardly from the flange 1 and provides a plane smooth vertical face of suitable area on its outer side for the purpose hereinafter referred to.

The cap Q is, as shown in the drawing, of considerable thickness and is a valuable adjunct in mine car service because of the fact that its flange 1 projects for some distance outwardly from the outer face of the hub C and serves as a stop to prevent the passage of dust in between the wheel and the journal box. It is well known that the fine dust, with which the air is impregnated in coal mines, drops by gravity upon the hub of the wheel, as ordinarily constructed, and unless some means is provided to permit this to fall off during the rotation of the wheel, it will find its way into the bearings, thereby leading to an early destruction of the wheel assembly, and while flange 1 of the cap serves as a reinforcing member for the inner end of the hub, it also serves as a means to retard and practically prevent the flow of dust from the normal face of the hub into the bearings, thereby prolonging the life of the wheel. The web 2 or 2ª extending inwardly, as shown, is provided on its inner side preferably with a flange C' adapted to secure the rollers in position and the web 2 may be thickened to receive the packing X or it may extend vertically inwardly, as shown in Fig. 2, with a plane rear face of considerable area. While the rear face 5 of the web 2 is a smooth plane surface adapted, if desired, to contact with the outer face 6 of the journal box, it is preferred that a washer 7 contact with such face 5, which washer is free to rotate upon the axle H and between the rear face 5 of the cap Q and the journal box.

The wheel hub may be cast generally as shown in the drawings with this difference, however, that when the hub is cast the portion P may be formed of greater thickness than is illustrated so as to provide such thickness of metal as will result in a relatively soft casting, after which it is preferred that some of this metal shall be machined off to reduce the external diameter of the extension P and form on its outer circumference a smooth surface upon which the cap Q may be forced to the position shown. This trimming or machining is done in the process of production after which the sleeve L is inserted, the bearing rollers are placed in the sleeve within the roller bearing chamber of the wheel, the cap Q is properly positioned and then is forced, by suitable means, upon the portion P of the hub, and it is preferred that the internal diameter of the cap and the external diameter of the portion P of the wheel shall be so nearly uniform that a considerable pressure must be exerted to position the cap as shown in Fig. 1. Such pressure may approximate a ton or more without injury to either the cap or the wheel hub, and when the cap is driven home the front face or inner face 3 of the cap preferably rests in approximate contact with the rear edge portion 8 of the hub and outer end of the sleeve L, thereby locking the sleeve in position. When this is done it is obvious that the cap will remain in position practically during the life of the wheel and serve as means for reinforcing the inner portion of the hub as an end wall to retain lubricant within the hub, to secure the roller bearing assembly in position, and to provide a suitable friction-reducing surface between the hub and the next adjacent member of the wheel assembly, whether such member be the washer referred to, the face 6 of the journal box, or any means interposed between them.

It may be convenient to secure the cap in position by machine screws extending longitudinally into the hub through the web 2 of the cap, in which case the screws 10 project through perforations in the cap and into screw-threaded orifices extending longitudinally of and into the hub as shown. To prevent accidental loss of these screws, nut locks 11 have been employed with good results.

It is desirable that a sufficient quantity of lubricant shall be supplied to the wheel to lubricate not only the bearing rollers but also to permit the flow of a minimum quantity of such lubricant as may be entrained by the axle rearwardly or toward the car body and journal box. This lubricant finds its way along the axle in a sufficient quantity to prevent wear between the web 2 of the cap and the washer 7, and its flow is retarded by the packing X, thereby avoiding excessive loss of lubricant.

Instead of the flange C' being integral with the hub or with the cap, an annulus formed to rest between the roller spindles 12 and the axle may be employed if desired and the inner faces of the end walls of the hub may be in single planes throughout their respective areas, in which case other types of roller bearing assemblies may be substituted for the loose rollers illustrated.

Such annuli would occupy the positions of the flanges C' and serve the same function, differing from flanges C' in that they would be separately formed.

While the washer 7 is not illustrated in Fig. 2, it may be used with details of construction there illustrated, if desired.

The bolt or pin F' may be secured in position by suitable nut or a screw-threaded end portion. In some instances it may be desirable to use a T-head pin as shown in Fig. 2 in which case the packing $f$ should be slipped on the smaller end of the pin F' before the wedge-shaped pin $g$ is inserted in the opening therethrough and driven home to lock the pin in position, and it is evident that packing may be interposed between the head of pin F' and the wheel hub, if desired, thereby preventing loss of lubricant through the openings in the hub which are provided for the pin.

The journal box T is of a relatively conventional type which is provided with outstanding flange U and axle bearing 13, the former partly or wholly covering the flange 1 of the cap Q, as shown, thereby directing particles which may fall by gravity from a car toward the spokes of the wheel and outwardly from the said flange, and thus materially assists the cap flange to exclude dust from the bearings. The axle may be of the floating type or provided with the collar 14, as may be desired, and is free to rotate in the journal box, if desired.

What we claim is:

1. In combination, a journal box, an axle therein, a wheel secured on said axle said wheel having a hub cast with a closed outer end wall and an open inner end, bearing rollers in said hub, a reinforcing cap secured upon and surrounding the inner end of said hub and extending in thickness radially outwardly therefrom, said cap also having an inwardly extending web lapping the ends of rollers in the wheel and adapted to retain the rollers in position as well as to serve as a bearing between the wheel hub and an adjacent journal box.

2. In combination, a journal box, an axle therein, a wheel secured on the outer end of said axle, said wheel having a hub cast with a closed outer wall and an open inner end, a flanged cap paralleling the said inner end extending radially therebeyond and inwardly toward the center of said hub, bearing rollers in the hub held in position by said inwardly extending portion of the cap and a perforated wall at the opposite end of said hub.

3. In a truck the combination of a journal box, an axle rotatable therein, a wheel secured to and rotatable on said axle, said wheel having a hub portion provided with a chamber adapted to receive a roller bearing therein, an end wall of said chamber being formed intermediate the ends of said axle, bearing rollers independently revoluble in said chamber and a reinforcing cup-shaped washer secured upon and surrounding an inner end portion of said hub, said washer encircling the hub and extending inwardly thereof to provide means for retaining the bearing rollers in position and to retard the flow of lubricant from the roller bearing chamber.

4. In a truck, a journal box, an axle extending therein, in combination with a wheel rotatably secured upon said axle, said wheel including a hub portion cast as an integer with an outer end wall, a wall intermediate its ends and an open inner end, a cap reinforcing and extending radially from the inner end of the hub thereby forming a dust retarding shoulder and provided with an integral inwardly extending flange having an inner face with a plane area adapted to contact with the inner edge of the wheel hub and of sufficient thickness to provide a rigid bearing to resist end thrusts toward said journal box.

5. A cast wheel hub closed at its outer end and open at its inner end and a reinforcing cap paralleling and extending over the inner end of the hub extending radially therebeyond and also being provided with an inwardly extending web portion partially closing the inner end of the hub and presenting a plane surface to contact with the inner end of the hub and to structural parts at the rear of the hub, in combination with a journal box partly inclosing said wheel, an axle in said box and wheel, and a washer rotatable on said axle between the wheel and journal box.

6. A roller bearing mine car wheel having a hub portion provided with an end wall and including a chamber for bearing rollers, said hub having an inner end with a smooth perimeter, a cap secured upon the inner end of the hub inclosing a portion of it and having a web portion partially closing said chamber, in combination with a journal box, an axle therein and friction reducing means between the cap and said journal box.

7. In combination, a wheel hub cast with an outer end wall and entirely open at its opposite end and a circumscribing reinforcing cap secured in position at the open end, said cap including a vertical web portion adapted to partially close said open end, in combination with a journal box lapping said cap, an axle movable in said journal box, and means for securing the wheel on the axle so as to hold it partly within said journal box.

8. In combination, a journal box, an axle therein, a wheel secured on said axle said wheel having a hub cast with a closed outer end wall and an open inner end, a reinforcing cap secured upon and surrounding the inner end of said hub and extending radially in thickness outwardly therefrom, said cap also having an inwardly extending web adapted to serve as a bearing between the wheel hub and an adjacent journal box.

9. In combination, an axle, a wheel secured on the outer end of said axle, said wheel having a hub cast with a closed outer wall and an open inner end, a flanged cap paralleling the said inner end extending radially therebeyond and inwardly toward the center of said hub, and a journal box surrounding said cap and being adapted to coöperate therewith to exclude dust from the axle.

10. In a truck, a journal box provided with an enlarged open end, an axle extending into said journal box, in combination with a wheel rotatably secured upon said axle, said wheel including a hub portion cast as an integer with an outer end wall, a wall intermediate its ends and an open inner end, a cap reinforcing and extending radially from the inner end of the hub within said open end of the journal box, thereby forming a dust retarding means and being provided with an integral inwardly extending web having an inner face with a plane area adapted to contact with the inner edge of the wheel hub and of sufficient thickness to provide a rigid bearing to resist end thrusts toward said journal box.

11. A cast wheel hub closed at its outer end and open at its inner end and a reinforcing cap paralleling and extending over the inner end of the hub extending radially therebeyond and also being provided with an inwardly extending web portion partially closing the inner end of the hub and presenting surfaces to contact with the inner end of the hub and to structural parts at the rear of the hub, in combination with a journal box partly inclosing said wheel and said cap, an axle in said box and wheel, and means penetrating one of said parts adapted to lock the wheel on the axle.

12. A mine car wheel having a hub portion provided with an end wall, said hub having an inner end with a smooth perimeter, a cap secured upon the inner end of the hub inclosing a portion of it, said cap having a web portion in contact with the hub, in combination with a journal box partly inclosing said cap, an axle therein and friction reducing means between the cap and said journal box.

In witness whereof we have hereunto set our hands in the presence of two witnesses.

WARREN V. JOHNSON.
FREDERICK H. GIBBS.

Witnesses:
R. A. LOCKARD,
R. C. HEPNER.